United States Patent [19]

Priest

[11] 4,354,999

[45] Oct. 19, 1982

[54] PLASMA CONFINEMENT

[76] Inventor: Robert V. Priest, 337 N. Cassingham Dr., Columbus, Ohio 43209

[21] Appl. No.: 77,996

[22] Filed: Sep. 24, 1979

Related U.S. Application Data

[63] Continuation of Ser. No. 752,392, Dec. 20, 1976, abandoned.

[51] Int. Cl.$^3$ .............................................. G21B 1/00
[52] U.S. Cl. .................................... 376/142; 376/122; 376/128
[58] Field of Search .................................. 176/1, 3–5; 376/142, 100, 128, 122

[56] References Cited

U.S. PATENT DOCUMENTS

| | | | |
|---|---|---|---|
| 3,177,408 | 4/1965 | Mills et al. | |
| 3,378,446 | 4/1968 | Whittlesey | 176/1 |
| 3,414,835 | 12/1968 | Miller | 331/945 |
| 3,624,239 | 2/1970 | Fraas | 176/1 |
| 3,755,073 | 8/1973 | Haught et al. | 176/5 |
| 4,007,392 | 2/1977 | Valfells et al. | 176/3 |

OTHER PUBLICATIONS

Nuclear Fusion, vol. 9, 1969, pp. 253–258, Moir et al.
UCRL-50021-75, 3/76, p. 25.
IEEE Pub. No. 77CH1267-4-NPS, 10/77, pp. 349–353, Turner.
Controlled Thermonuclear Reactions, Glasstone et al., D. Van Nostrand Co., Inc., Princeton, New Jersey, 1960, pp. 77–79.

*Primary Examiner*—Harvey E. Behrend
*Attorney, Agent, or Firm*—Frank H. Foster

[57] ABSTRACT

An Atomic Fusion Device wherein a laser beam is focused to the center of a spherical reaction chamber having a mirrored inner surface. The spherical reaction chamber is evacuated and surrounded by a concentric lithium jacket which is surrounded by a concentric cryogenic jacket in which is immersed a multiaxis Ioffe bar system. A mixture of deuterium and tritium plasma is continuously introduced into the reaction chamber at a metered rate through the preheat units and compressed at the center of the chamber by the electromagnetic field created by the superconductive Ioffe bar system. This mixture is ignited by the laser beam to create a steady-state, self-sustaining lithium blanket. Power is controlled by controlling the plasma input rate and energy is coupled out of the device by electromagnetic coupling or by recirculating the lithium through a heat exchanger.

3 Claims, 9 Drawing Figures

1

PLASMA CONFINEMENT

BACKGROUND OF THE INVENTION

This application is a continuation of my prior application filed Dec. 20, 1976, Ser. No. 752,392, now abandoned.

Over the past 20 years the scientific community has undertaken one of the most difficult tasks in technology, that of devising a feasible method of, and apparatus for, atomic fusion.

Because of the limited supply of fossil fuels (i.e., coal, oil, natural gas), recently much attention has been directed to the problem of developing a nuclear fusion reactor. A device of this type could provide a solution to the world's power supply shortage since one of the basic fuels is deuterium, or heavy hydrogen which is contained in the oceans in nearly inexhaustible amounts. Furthermore, a fusion reactor would be inherently stable and not subject to explosion. Hence, if fusion reactors can be made to yield useful power, it will solve the earth's fuel problem.

Of the dozens of proposed nuclear fusion reactors, few seem to show an immediate potential feasibility for producing controlled atomic fusion.

The large repellent forces, caused by the positive electronic charges on the nuclei prevent the nuclear collisions that are necessary to produce fusion reactions.

Only those reactors with nuclear fusion cross sections larger than a millibar ($10^{-27}$ cm$^2$) or energy below 50 KEV merit consideration. Any system for net power production from nuclear fusion must provide an area where the fuel nucleus undergoes many collisions with other nuclei before leaving the system. Therefore, any fuel entering the system will become randomized and develop a kinetic equilibrium described by a temperature (Maxwellian Distribution) and should be in the form of a hot gas.

A great many problems are associated in creating the conditions just described. Two of the most fundamental problems lie in the realm of plasma physics, namely; confinement and heating of plasma. The problem of heating a plasma to the required temperature and confining it for the length of time implied by the Lawson criteria, has occupied the attention of hundreds of scientists and engineers in a dozen countries for about 20 years. Confinement may be accomplished either by a gravitational or electromagnetic field. Failing this only inertially confined system (explosions) can be utilized. All prior magnetic containers for hot plasma devices known to me fall into two general categories: those that are closed and those that are open. Neither of these systems are suitable by themselves for stable confinement. An open system can be made suitable by the addition of conventional "Ioffe bar" named after the Russian Physicist who announced his advancement in 1961.

Although the Ioffe bar system creates a stable confinement, those plasma particles with velocities parallel to a field line (i.e., parallel to the longitudinal axis) leave the volume and escapes directly along the line creating large end losses.

DESCRIPTION OF THE PREFERRED EMBODIMENT

Figure 1:
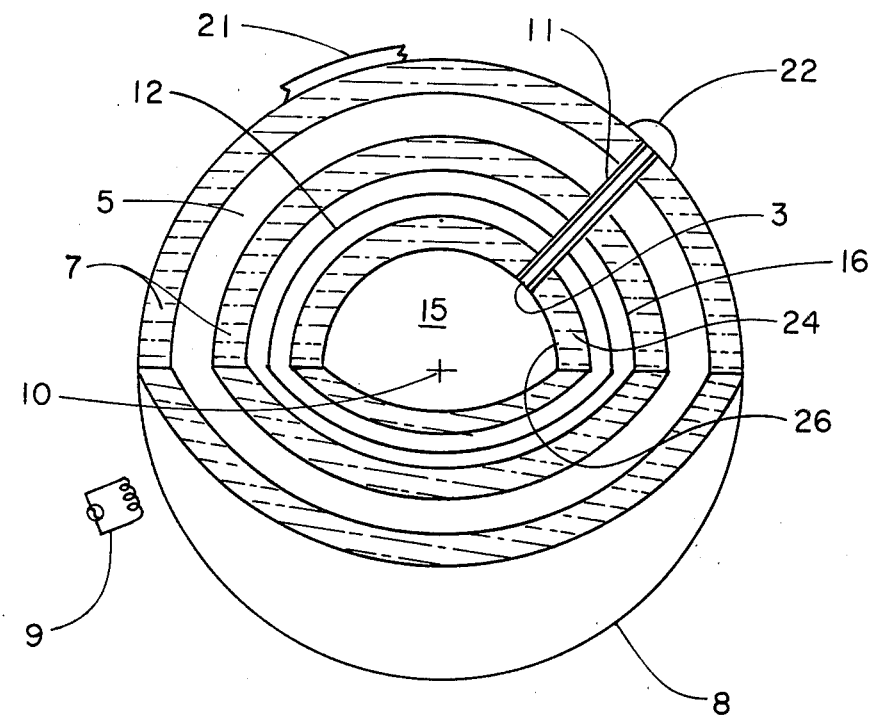
FIG. 1 is a view in perspective with a quarter section removed of a reactor embodying the present invention.

A power reactor can be built by combining the following:

1. A vacuum tight reaction chamber, in which a low density pure gas of fusible isotopes, such as an equal volume of deuterium and tritium at a density of $5 \times 10^{14}$ cm$^{-3}$ can be heated to reacting temperature and confined such that, the average temperature, and confinement time are 5 KEV (50,000,000° K.) and one (1) second;
2. A spherical structure consisting of a lithium blanket and shield surrounding the reactor chamber in which neutrons will be thermolized and tritium will be generated;
3. A magnetic Ioffe bar system for generating a confining magnetic field;
4. A thermal cycle in which the heat produced in the blanket is converted to electricity by a conventional power couple;
5. An ignition system consisting of lasers fired through one way apertures and focused to the center of the reaction chamber.

The translation of these broad categories, and the numerous subsystems they imply from concept to design are as follows:

1. Reaction Chamber

The reaction chamber consists of a stainless steel spherical structure eight (8) meters inside diameter, with a wall thickness of 254 mm.

A low density plasma consisting of an equal mixture of deuterium and tritium (plus associated electrons) at an operating temperature of $4 \times 10^3$K is introduced into the reactor chamber through the preheat units. The pressure of the low density but high temperature plasma is a few atmospheres and is supported by a magnetic field throughout the entire region of approximately 10 teslas (100,000 guass). The interior walls of the chamber are coated with Beryllium. This coating serves two purposes. First, it acts as a neutron multiplier to make up the neutron deficiency caused by burning tritium (for every triton burned only one neutron is generated and it takes one (1) neutron to breed a triton). Secondly, it serves as a refractory material for the inner surface of the reaction chamber.

Covering the inward surface of the Beryllium is a plated coating of copper and nickel. After these coats have been polished a coat of chromium is plated onto the innersurface. This coating of the innersurfaces serves two (2) purposes. First, it reflects the radiant energy back to the focal point of the sphere and secondly, it prevents radiant heat transfer through the walls of the reaction chamber, thus, cooling the walls.

2. Lithium Blanket and Thermocycle

Outward from the reaction chamber is a lithium blanket which completely surrounds the reaction chamber. This blanket performs three functions. First, the energy of the 14 MEV neutrons is converted to heat in this region. Secondly, the tritium is bred by neutron absorption in the lithium blanket. Thirdly, the heated lithium at 1250° F. provides the primer mover for the conventional thermo cycle. As the lithium is heated in the reactor it is pumped through a condenser to cool the reactor at the rate of 1600 gallons per minute. The condenser for the reactor is the boiler for the conventional steam cycle. This system would work the same way that a conventional mercury vapor topping unit on a steam cycle works today.

3. Ioffe Bar Magnetic System

Outward from the lithium blanket is the Ioffe bar system. The system will be superconductive and therefore be immersed in a cryogenic medium at a temperature of 4° K. The wire consists of $V_3GA$ which is usable beyond 20 teslas. Its primary purpose is to provide a confining magnetic field for D-T plasma.

Figure 3:
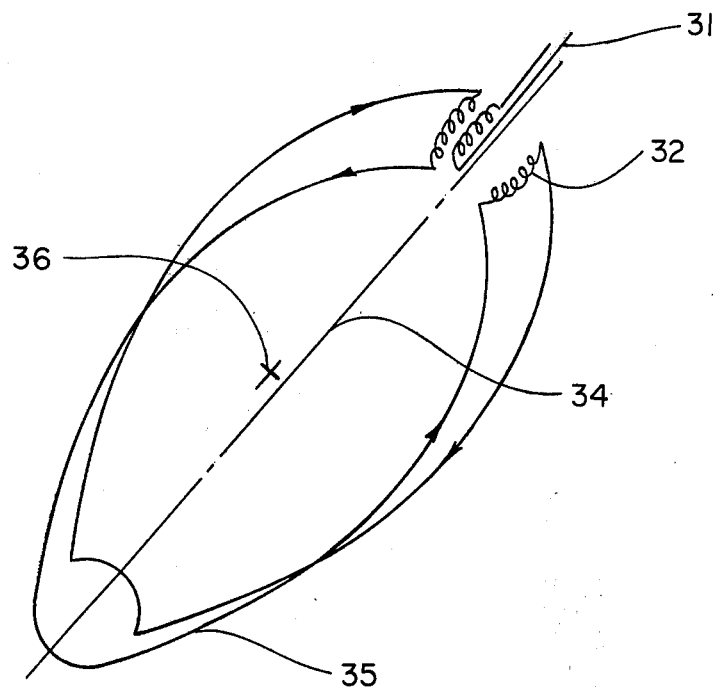
FIG. 3 is a view of a single Ioffe bar winding.

The general shape of the windings are shown in FIG. 3.

The basic idea behind the Ioffe bar system is to provide a magnetic field configuration in which there exists a region where the intensity of the magnetic field increases in every direction outward from the center. In such a field, plasma is stably confined since escape for most particles requires an increase in energy. A cylindrical configuration leaks badly since lines of force leave the volume and although most of the plasma particles are confined, those with velocity vectors parallel to a field line leave the volume and escape directly along the line.

The Ioffe bar windings used in this invention have been modified to conform to a spherical configuration to reduce end loses.

In accordance with Laplace's law or the Brol-Savart relation the magnetic field intensity at any point P is:

$$dh = \frac{I \sin \alpha ds}{v^2}$$

Figure 4:
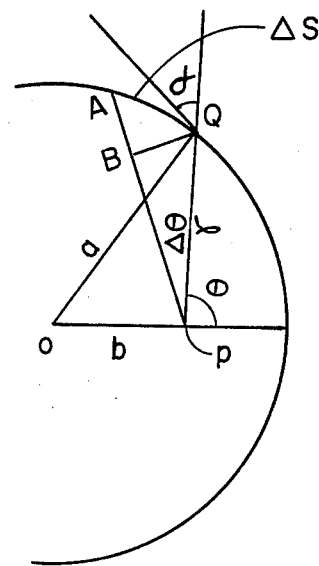
FIG. 4 is a geometric diagram for the calculation shown in the application.

Referring to FIG. 4, current I flows in a circular loop of radius "a" (cm) and point "P", at which the field intensity is desired is distance "b" from center "O" of the loop. Although there are two cases according as "P" is within or without the reaction chamber, for our purposes we will only consider the one within the reactor. The first case may be diagrammed as shown in FIG. 4 of the drawing. If "P" is inside the reactor then b is less than a and $\theta$ is the angle between the radius vector $v$ from "P" to any point "Q" on the Ioffe bar spherical configuration and a line through "O" and "p". If $\Delta S = QA$ is an arc of the circular loop angle APQ will be $\Delta\theta$. With "P" as the center and radius $v$ describes a circle arc cutting PA at $B_1$ and let $\beta$ be the angle between QB and S. Since QB is perpendicular to $v$, and $\alpha$ is the angle between $v$ and $\Delta S$, we have $\alpha = 90 - \beta$. Therefore, $\Delta S \sin \alpha = \Delta S \cos \beta$ but $\Delta S \cos \beta$ is $\approx v\Delta\theta$ (approximate expression for field intensity at "P" due to $\Delta S$)

$$\Delta H = \frac{I \Delta \theta}{v}$$

-continued $$H_1 = I \int_0^\pi \frac{d\theta}{v}$$

<OPQ we have from the law of cosines—

$$a^2 = b^2 + v^2 - 2bv\cos(180° - \theta) =$$

$$b^2 + v^2 + 2bv\cos\theta$$

solving for:

$$v = -b\cos\theta \neq \sqrt{b^2\cos^2\theta + a^2b^2}$$

$$= -b\cos\theta \neq \sqrt{a^2 - b^2\sin\theta}$$

since $v$ is positive I choose and used $v$ $$H_1 = I \int_0^\pi \frac{d\theta}{\sqrt{a^2 - b^2\sin^2\theta} - b\cos\theta}$$

Multiply numerator and denominator of the integrand by $\sqrt{a^2 - b^2}\sin\theta + b\cos\theta$ to rationalize the denominator.

$$H_1 = \frac{I}{a^2 - b^2} \int_0^{2\pi} \left( \sqrt{a^2 - b^2\sin\theta} + b\cos\theta \right) d\theta$$

$$= \frac{I}{a^2 - b^2} \int_0^{2\pi} \sqrt{a^2 - b^2\sin\theta} \, d\theta$$

Since $$\int_0^{2\pi} \cos\theta d\theta = O$$

and since $y = \sqrt{a^2 - b^2\sin^2\theta}$ has a symmetrical graph we may write:

$$H_1 = \frac{4I}{a^2 - b^2} \int_0^{\pi/2} \sqrt{a^2 - b^2\sin^2\theta} \, d\theta$$

$$\neq \frac{4Ia}{a^2 - b^2} \int_0^{\pi/2} \sqrt{1 - K^2\sin^2\theta} \, d\theta$$

where $$K = \frac{b}{a} < 1$$

Therefore dividing numerator and denominator of the coefficient of the integral by $a^2$:

$$H_1 = \frac{4I}{a} \frac{E(K_1)}{1 - K_1^2}$$

if $K_1 = 0$ "P" is at the center of the reactor and since $E(O) = II/2$ the familiar formula:

$$H_1 = \frac{\pi I}{a}$$

as $K_1 \to 1$, P→conductors; $E(K_1) \to 1$ H→d; as predicted from Ampere's law.

From the above treatise it may be seen that the plasma is stably confined since the intensity of the magnetic field will increase at all points outward from the center of the reactor $K=0$ to $K_1=1$.

Furthermore, the semiconducting plasma is thus caused to drop through the magnetic field potential from the walls of the reactor to the center $K_1=1$ to $K_1=0$ and stably confined there. Although the magnetic fields just described provide a stable confinement of the plasma (increased energy to leave the volume) those particles with velocity vectors parallel to a flux tube still tend to leave the volume through the ends. This is called end loss. To further reduce this loss in the device of the invention, the minimum field intensity axis of the Ioffe bar system is offset from the center of the sphere (see FIG. 3) a distance "P". since the Ioffe bar windings are multipole, the minimum field intensity axis of the Ioffe bar system is offset from the center of the sphere (see FIG. 3) a distance "P". Since the Ioffe bar windings are multipole the axes of minimum field intensity form a family of straight lines of the form (A)$f(x,y,\theta,) = x \cos \theta + Y \sin \theta - P = 0$ differentiating with respect to $\theta$ (B)$f_\theta(x,y,\theta,) = X \sin \theta + y \cos \theta = 0$ Multiply: (A) by $\cos \theta$ and (B) by $\sin \theta$
and subtract: $x = P \cos \theta$
eliminate X between (A) and (B). The parametric equation of the envelope of the Ioffe bar minimum field intensity axis is as follows:

$$\begin{cases} X = P \cos \theta \\ Y = P \sin \theta \end{cases}$$

Squaring these equations we get $X^2 + Y^2 = P^2$
This is the retangular equation of the cross-section of the reactor ignition point.

Figure 7:
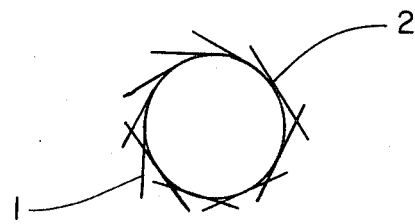
FIG. 7 is a geometric diagram showing the containment envelope of the Ioffe bar system.

In other words, end loss will be reduced since as particles with velocity vectors along a flux tube experience additional collisions in the ignition envelope and again become radomized in this area. FIG. 7 illustrates the envelope of minimum field strength axis 1. The equation of these lines is $X \cos \theta = +y \sin \theta - P = 0$. The tangent points of this family of straight lines is described by the equation $X^2 + Y^2 = P^2$ as shown above. The envelope is shown in FIG. 7 as item 2.

Another function of the Ioffe bar system is to continuously pump new fuel to the ignition point from the preheat units and purge the helium by products. This is made possible by the differences in the degree of ionic dissociation between deuterium and tritium and the by product helium. For example, if incoming D-T fuel possesses organized motion it will be randomized by subsequent collisions and reactants will develop a kinetic equilibrium describable by a temperature; that is, they will possess a Maxwellian distribution, and the fuel will be in the form of a hot gas. Since the energy required to produce a reasonable reaction rate is in the Kiloelectron-volt region, well above the ionization energy of the light elements that are of interest, the gas will be a fully ionized plasma. In this state the ion density $\eta i$ is equal to the electron density $\eta e$ and the magnetic field of 10 teslas (100,000 guass) induces current into the ionized deuterium and tritium. Under these conditions the Ioffe bar system will force the plasma to the center of the sphere, i.e., to the focal point of the lasser system. This force may be expressed as follows:

$$F = \frac{BIL}{10}$$

Where: F is the magnetic force against the plasma in dynes, I is the induced current in amps. In the plasma and L is the length of the path of the plasma current in centimeters. If the ionic current path is not at right angles with the flux but at an angle $\theta$ then the length of the ionic current path is L sin $\theta$.

$$F = \frac{BIL \sin \theta}{10}$$

Since the ionic current which is induced into the plasma by the magnetic field is proportional to the degree of ionic dissociation, the helium by products of the reaction will induce lower currents than in the deuterium-tritium plasma and thus will not be forced to the center of the sphere by the same force shown above. Since there is a density gradient, this transport process should be governed by a law of diffusion, Fick's law, which states that the current density of the particles, $J(cm^{-2}S^{-1}$, is given by $J = -D\nabla\eta$ Where $(\nabla\eta)$ is the gradiant of particle density, (D) is the diffusion coefficient $(cm^{-2}S^{-1})$. Therefore, the by product helium, is transported from the center of the reaction chamber to the walls where it can be purged from the system.

4. Laser Ignition and Fuel Injection

Figure 5:
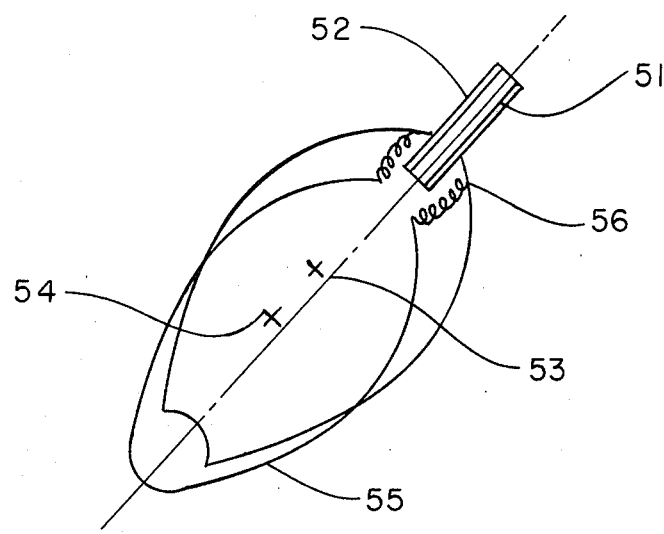
FIG. 5 is a drawing showing installation of a single Ioffe bar and laser unit.
Figure 6:
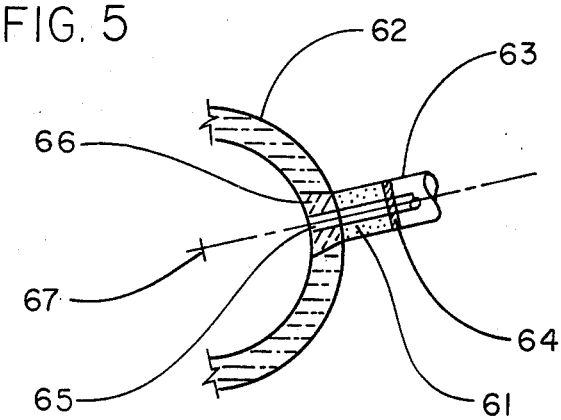
FIG. 6 is a drawing showing the laser pumping configuration.

Neodymium glass lasers are used for the initial ignition of the D-T fuel. The system comprises numerous neodymium laser entry points which are fired in sequence through one-way apertures in the reaction chamber wall (see FIG. 5). Since only one laser is fired at a time the other lasers are pumped in sequence for a subsequent firing order. The energy of the pulse is $10^7$ joules with a pulse duration of less than $10^{-9}$ seconds and are introduced into the reactor chamber through the ports at the ends of the Ioffe bar system as shown in FIG. 5 of the drawing. A more detailed drawing of the working parts of the preheat chamber and the laser is shown in FIG. 6. The outward end of the preheat unit is given a negative charge 6 and the inward end a positive charge 4. The container is filled with a deuterium-tritium mixture. The fuel will then conduct an electric current which ionizes it. This will permit a flow of electrons between the positive and negative plates. The plasma current is surrounded by circular lines of magnetic force which tend to pinch inward. As the lines of force push the plasma inward toward the center it is completely ionized and becomes a semiconductor. At this stage the valve is open by moving it inward toward the center and the plasma is allowed to enter the reaction chamber where it is forced to the center of the sphere by the magnetic field of the Ioffe bar system. The same system may be used to remove the helium by products from the walls of the reaction chamber. As may be seen from FIG. 6 the preheat units can also be used to pump the laser system.

An additional heating effect of the Ioffe bar confinement system may be realized by providing the proper frequency to cause resonance. If we consider a group of quantum mechanical effects which are related to resonance we find that periodically varying energy to a system close to the natural frequency of the D-T fuel will cause additional heating effects known as cyclotron resonance heating. One of the simplest examples of this is pushing a swing; we are familiar with the large amplitudes that can be achieved by proper timing. The frequency may be calculated as follows:

When a particle moves in a curved path, it takes a force directed towards the center—centripetal force—to keep it in this path.

$$V = R \frac{d\theta}{dt}$$

Where R is the radius $$V = RW \quad W = \frac{V}{R}$$

The centripetal accelleration would then be:

$$a_\gamma = \frac{d^2x}{dt^2} \cos\theta + \frac{d^2y}{dt^2} \sin\theta = -\frac{V^2}{R}$$

Where $\theta$ is the polar angular coordinate of the centipetal force—$MV^2/R$

If an electron is moving with a velocity V at right angles to a uniform magnetic field $\beta$ the force exerted on the electron will be:

$$F = \beta ev$$

If we equate this to the centripetal force to the force exerted by the uniform magnetic field we get:

$$\beta ev = \frac{MV^2}{R}$$

since $$W = \frac{V}{R} \quad W = \frac{\beta e}{M}$$

In order to get the cyclotron resonance frequency we must first determine the effective mass as follows: energy (E) = plank's constant ($\eta$) X frequency ($v$).

Where $\eta = 6.6 \times 10^{-34}$ joules/sec. also by De Brogle's relation the momentum (P) = $\eta \times k$ Where K is proagation constant or wave number and is related:

$K = 2\pi/\lambda$ where $\lambda$ is the wave length $E = \frac{mv^2}{2}$ momentum $P = mv$ $E = \frac{P^2}{2m}$ since $P = hk$ $$E = \frac{h^2k^2}{2m}$$

differentiate with respect to K.
again $$\frac{dE}{dk} = \frac{h^2k}{m}$$

$$\frac{d^2E}{dk^2} = h^2/m$$

$$m_e = h^2 / \frac{d^2E}{dk^2}$$

$m_e$ is the effective mass of the electron.
Therefore, the cyclotron resonance frequency is as follows:

$$\omega = \frac{Be}{m_e}$$

This is the frequency that should be impressed on the Ioffe bar system to get the maximum absorption of the magnetic field energy in the plasma. In other words, the maximum heating will occur at this frequency.

DESCRIPTION OF DRAWINGS

The novel features which are believed to be characteristic of my invention both as to structure and to its method of operation, together with further objects and advantages thereof, will be better understood from the following description considered in connection with the accompanying drawing, in which several of the embodiments of the invention are illustrated by way of example. It is to be expressly understood, however, that the drawings are for the purpose of illustration and description only, and are not intended as a definition of the limits of the invention.

FIG. 1 is a sectionalized side view of one of the embodiments of the invention. As shown in FIG. 1, a laser system 22 is fired through a one-way mirror 3 into an inner sphere 15 which is evacuated and mirrored on the innersurface 26. The laser beam is focused to the center of the sphere which creates an extremely high temperature point 10. A lithium blanket 24 surrounds the inner sphere producing the tritium required for the reaction. As stated in the equation. A cryogenic jacket 7 surrounds the Ioffe bar system. The superconducting Ioffe bar system 5 is emersed in the cyrogenic jacket and serves as a secondary coil to electromagnetically force the deuterium-tritium plasma to the focal point inner sphere. A preheat chamber 11 supplies fuel to the inner sphere. A primary coil 9 outside of the reactor induces a current into the superconductive Ioffe bar system. An outer shell 8 surrounds the cyrojacket. Suitable insulation material 21 surrounds the cryojacket to prevent heat transfer from the atmosphere.

Figure 2:
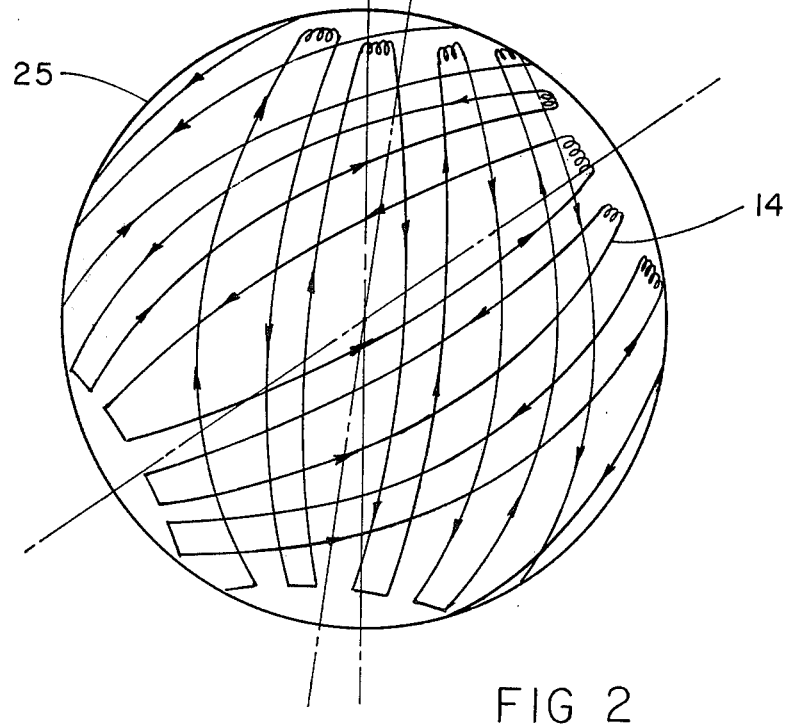
FIG. 2 is a diagram illustrating the Ioffe bar windings used in the embodiment of FIG. 1.

FIG. 2 illustrates the Ioffe bar system 14 modified to fit the sphere 25. FIGS. 1 and 2 are intended to represent identical structures, with FIG. 1 having less wiring detail and being more diagrammatic of the layers of the reactor.

The invention has a spherical innermost reaction chamber wall 15, preferably of stainless steel or titanium alloy, the innersurface of which is mirrored to reflect all laser energy to its center. A second concentric, preferably stainless steel, spherical wall is positioned immediately outward of the reaction chamber wall 26 to form a lithium jacket 24 between the inner wall and the second wall. Projecting through the wall of the reactor are the plasma preheat units 11. Spaced outwardly from the lithium blanket is the outer spherical shell 12 which provides a vacuum or other insulation between the lithium and the cryo shells. Outward from the insulating shell is the cryogenic jacket 7. The multiaxis Ioffe bar superconductive windings are contained in this cryogenic jacket and are supercooled by a circulatory supercooled medium such as liquid helium. In this manner the winding are maintained superconductive.

The central ignition chamber is evacuated. A meodymium glass laser 22 is fired through a one-way mirrored surface 3. The walls of the ignition chamber do not require a great strength due to the balance of pressure of the lithium outside and the reaction inside the ignition chamber.

The lithium blanket absorbs neutrons and provides prime mover for the power generation. Lithium is converted to Tritium in the lithium jacket 24. The laser 22 extends radially through the reactor wall and is focused to the center of the ignition chamber.

A one-way mirror protects the fuel source by reflecting radiant energy from the central ignition point. Tritium is separated from the lithium in the blanket by conventional techniques is also introduced into the reaction chamber through the same preheat units.

To overcome the end-loss difficulty in the prior art my device employees a number of Ioffe bars, the principle axes of which are offset from the center of the sphere that follow the spherical configuration of the ignition chamber. This produces an area of random collisions of the charged particles which are attempting to leave the volume along a flux line. These collisions occur in the outer shell of the ignition area resulting in a reduction of the end loss. The arrows in FIG. 2 indicates the direction of the current in the windings of the Ioffe bar system which is modified to follow the configuration of a spherical surface.

A more detailed view of the Ioffe bar windings may be seen in FIG. 3 where the primary coil 31 induces current into the secondary coil 32. This view also shows the center of the sphere 36, the axis of minimum electromagnetic field intensity 34 and the current carrying elements 35. The arrows again indicate the direction of current flow in the windings.

FIG. 4 shows the geometry for calculating the field intensity at any point in the reactor which was mentioned earlier in this specification.

FIG. 5 shows the position of the preheat fuel units 2, the laser 51, the secondary coil 56, the off-set of the Ioffe bar system axis 53, and the center of the sphere 54.

A more detailed view of the laser and preheat units may be seen in FIG. 6. In this drawing the laser 63 is shown inside the preheat unit 61. A positive plate 4 is provided and a negative plate 6 (bottom of valve) is provided to charge the D-T fuel for preheat. This is done by the thetapinch method. A fused quartz one-way mirror is used for the laser discharge into the reaction chamber. The valve is projected forward through the ignition chamber wall 62 to allow the fuel to enter the ignition chamber. The laser pulse passes through the center of the sphere 67.

FIG. 7 shows the axes of the Ioffe bar system 1 and their envelope 2. These calculations are shown earlier in the specification.

Figure 8:
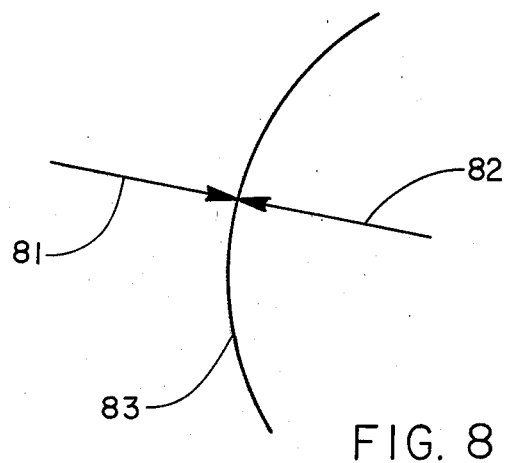
FIG. 8 is a geometric diagram showing one equilibrium region between the electromagnetic field of the Ioffe bar system and the outward force of the plasma.

FIG. 8 shows the isopestic line 83 between the force of the electromagnetic field 1 and the outward force of the plasma 82.

$$\text{Force } 1 = \beta/8\pi \qquad \text{Force } 2 = hkt$$

A dimensionless number, is used as an index of the effectiveness of the magnetic confinement:

$$\beta = \frac{hkt}{B^2/8\pi}$$

OPERATION

The ionized fuel at a temperature of 4000° R is injected into the chamber continuously from the preheat units and forced to the center of the sphere, which is the focal point of the laser beam, by the electromagnetic field of the multiaxis Ioffe bar system. The laser is fired continuously only until thermonuclear ignition takes place. Since energy cannot be transmitted from the focal point of the ignition chamber by radiation, conduction, or convection the temperature and pressure are increased continuously until the thermonuclear threshold is reached. Once ignition is reached, fusion takes place continuously by continuous introduction of new fuel and by the reflected radiant energy from the mirrored walls of the ignition chamber. This energy is reflected back to the ignition point at the center. At this time the laser can be turned off. The ionized fuel at temperature of 4000° R is injected at the innersurface of the ignition chamber, where reflective surfaces can protect the mechanisms from radiation. Any material such as stainless steel or titanium alloy, having a high reflective index may be suitable as a mirror substance, since the innersurface is cooled by the lithium circulation and the reflection of the radiant energy.

The Lawson criteria implies that for 50% D-T and a 33.3% efficiency reaction requires ion temperature of approximately 10 KEV. The ion density times the confinement time should be approximately equal to $10^{14}$ sec/cm$^3$. The magnetic field strength would be approximately 10 teslas (100,000 guass) in intensity. In this range a suitable Ioffe bar material may be ($V_3GA$).

The major problem in the existing fusion devices such as Tahomak and Stellarator is primarily that of plasma confinement. However, a recent test on T-3 Tahamak in Moscow indicated improvement in plasma stability with increased temperature. It appears that a diffusion process is operating. In these circumstances the confinement time will vary as follows:

$$t_c = \frac{T^2}{D}$$

Where "T" is the plasma temperature and "D" is the diffusion coefficient.

The multipole Ioffe bar system provides a magnetic field configuration in which exists a region where the intensity of the magnetic field is increasing in every direction outward from the ignition point.

Plasma in this magnetic field is stably confined and compressed since, for charged particles, it requires an increase in energy to move outward from the ignition point. The combination of the Ioffe bar windings described employs a number of Ioffe bars, the principle axes of which are made to be off-set from the center of the sphere or the ignition point and follow the spherical configuration of the ignition chamber. One of the problems with the Ioffe bar, open end confinement, art in the past has been that the plasma particles with velocity vectors parallel to the field lines leave the volume and escape along those lines thus resulting in high end loss. This is overcome in the present patent by having the principle axis of the Ioffe bar system intersect as mentioned above, thus producing an area of random collisions in the outer shell of the ignition point. An inverse law of electrohydrodynamics may be acting under these conditions, and may provide a more efficient way of obtaining useful power output. After the plasma reaches the ignition point it will expand outwardly with great force against the electromagnetic fields of the Ioffe bar system. If an inverse law is operating, electrical energy will be induced back into the Ioffe bar windings equal to the force of the plasma times the expanding distance. If this principle holds true, electrical energy can be simply induced into the Ioffe bar system from the expanding plasma. The laser preheating of the ignition chamber will greatly improve the plasma stability, since the latest experiments indicate that the plasma stability condition improves with temperature increase. The laser pulse energy should be between $2 \times 10^3$ joules and $10^7$ joules, as an example $10^6$ joules may be used. A low density plasma consisting of equal mixture of deuterium and tritium (plus electrons) at a temperature of 4000° R is fed continuously into the ignition chamber. The pressure of this low density but high temperature plasma is only a few atmospheres. At 4000° R this mixture becomes a semiconductor which can be pushed by an electromagnetic field to the center of the sphere which is the focal point of the laser system. The first wall outward from the ignition chamber is thin, cool by reflection for intercepting the electromagnetic radiation load and reducing the cooling problem. The wall has pressure on both sides and therefore eliminates the need for high structural strength. This wall is mirrored on the innersurface thus isolating the reaction region from the surrounding structure to maintain the purity of the low density plasma. A lithium blanket surrounds the wall which performs two functions:

(a) The neutrons (14 MEV) energy are converted to heat and;

(b) Tritium is bred by neutron absorption in the lithium blanket.

This shield will absorb almost all the neutrons and prevent damage to the Ioffe bar system outside. The equations for this conversion are as follows:

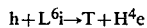

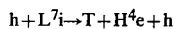

Outside the lithium blanket is the Ioffe bar system. This system is superconductive, immersed in cryogenic medium such as liquid helium, the by-product of the reaction, at a temperature of 4 to 10 K as stated previously. The Ioffe bar system generating a magnetic field of an average value of 10 teslas. As an example 12 teslas may be used. To do this the maximum field strength adjacent to the conductors may equal or exceed 15 teslas, which is within the practical operating limits for Nb3SN, the most popular superconductor now available.

New materials, such as V3GA are reported to be usable beyond 20 teslas. Various cryogenic materials may be used in the cryogenic jacket, such as, liquid nitrogen or helium.

Because of the very low temperatures in the cryogenic jacket and the heat transfer problem associated with them, the superconducting Ioffe bar system is inductively energized by a primary coil outside the jacket.

The deuterium and tritium fuel introduced through the ends of the Ioffe bars undergoes the following reaction:

It has been shown to be old art to use superconductive solenoids to generate electromagnetic fields, ref. Robert G. Mills, "Super conductive Solenoids with Overheat Protective Structures and Circuits". However, the use of superconductive Ioffe bar systems in spherical configurations for plasma confinement is a new use in combination with laser ignition for steady state fusion.

The use of laser ignition of a deuterium-tritium mixture is old art, ref., Authur P. Troos, "Pulsed Laser-ignited Thermonuclear Reactor".

This device is primarily a pulse device which requires the system to pass through the threshold temperature on each explosion.

The difficulties in this device is that the system goes through the temperature threshold on each fuel injection resulting in an atomic explosion with the associated shock phenomena, containment, and control problems.

My invention overcomes these difficulties since the temperature is maintained above the threshold temperature and the deuterium-tritium fuel is introduced continuously, creating a stable, self sustaining, steady state fusion device.

The use of laser ignition in a spherical chamber is also old art as shown in "Apparatus Using Lasers To Trigger Thermonuclear Reactors" by J. R. B. Whittlesey.

The difficulties in this device, as in the previous devices is one of alternation through the thermonuclear threshold temperatures, which would make it nonapplicable as steady state fusion device due to the shock and containment phenomena. Also, no electromagnetic or liquid, such as lithium containment of the plasma is used as it expands from thermonuclear ignition.

Figure 9:
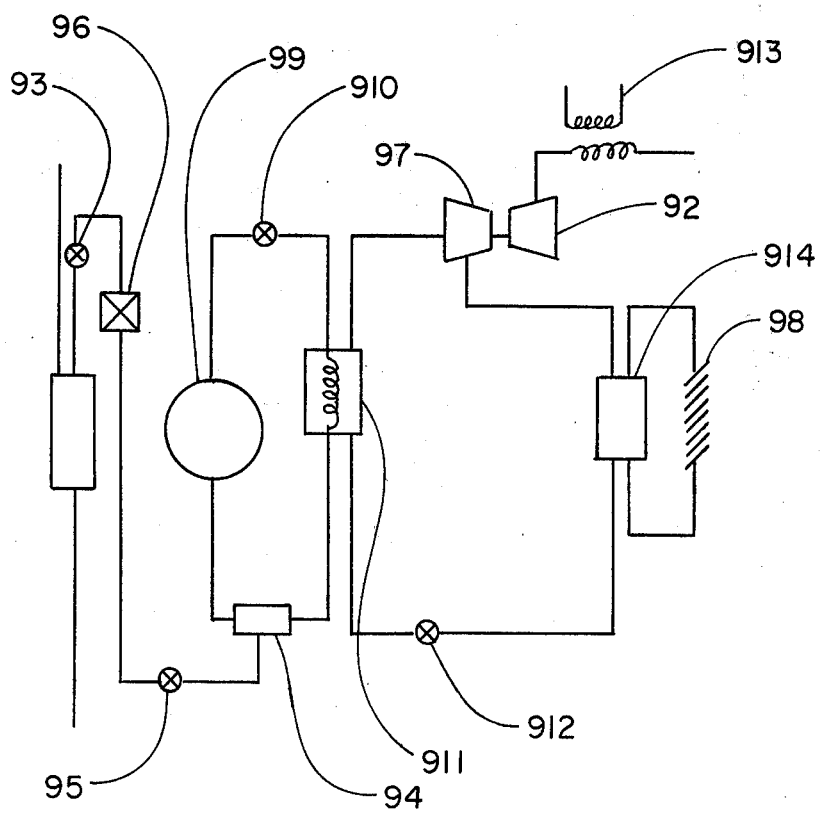
FIG. 9 is a schematic diagram of the power couple.

According to my improvement I overcome these difficulties by providing a system of electromagnetic confinement of the plasma at the point of ignition to produce a self sustaining, steady state, fusion where the nuclear threshold point is only traversed at ignition. After thermonuclear ignition the laser is shut off and the deuterium-tritium mixture is injected continuously into the ignition chamber to sustain the reaction. In FIG. 9 a deuterium extraction unit 91, extractor valve 93, a deuterium pump 96 which pumps deuterium into the reactor. A second valve 95 is provided to control feed into the tritium extractor 94. Lithium is pumped out of the reactor 99 by pump 910 and through the lithium heat exchanger 911. The lithium heat exchanger heats the steam for the turbine 97 which drives the generator 92 and power is coupled out through transformer 913. Steam is then pumped out of the turbine through the condenser 914 and 98 and pumped back into the turbine through a condenser 911.

In FIG. 9 the energy conversion system operates as a lithium top unit. Energy would be converted either by this system or by the electrohydrodynamic inversion principle as described previously.

The structure of the power couple consists of three main parts, namely; an extraction cycle, a lithium cycle, and a steam cycle. The structures of each of these are as follows:

(a) In the extraction cycle sea water is pumped in and deuterium extracted from it in the conventional manner. The deuterium is then pumped into the mixing area through the deuterium control valve. Tritium is pumped from the tritium extractor, through the tritium valve and into the D-T mixing area.

(b) In the lithium cycle lithium is heated by nuclear bombardment. The lithium is then pumped through a heat exchanger to heat water and produce steam for the steam cycle. The lithium is then pumped back through the tritium extractor where the tritium is removed from the lithium.

(c) In the steam cycle water is heated to steam in the lithium heat exchanger. This steam runs a conventional steam turbine which drives a conventional generator which produces useful electric energy. The steam is then condensed through a conventional flow through and cascade condensers and the water pumps back through the lithium condenser.

Additional parameters and examples of the operational embodiments are as follows:

1. Laser

A neodymium glass laser with an energy of $2 \times 10^3$ to $10^7$ joules is needed for the ignition system. As an example a laser with an energy of $10^6$ joules, a power of $10^{12}$ watts, a pulse duration of $10^{-9}$ sec. and a wave length of 5280 Å may be employed.

2. Ignition Chamber

The temperatures in the ignition chamber could operate at temperatures from $70 \times 10^{6\circ}$ F. to $100 \times 10^{6\circ}$ F. as an example, the above reactor would operate at a temperature of $85 \times 10^6$ F. The pressures at the inside wall would only be a few atmospheres, a typical pressure would be 30 psi. The thickness of the various layers of the reactor are as follows:

As mentioned earlier in the specification the ignition chamber wall thickness would be 254 MM in the lithium in the blanket would be in the liquid state and would be pumped through the system at the rate of 1600 gallons per minute. It would operate at a temperature of 900° to 1880° F. As an example for a steam power couple it would operate at about 1550° F. since the superheat range for the steam cycle would be about 1250° F. The lithium blanket thickness would be 57 cm. Outward from the blanket would be a 58 mm vacuum barrier.

The cryojacket for the Ioffe bar system would be 40 cm thick and operate at a temperature of about 4° R A low temperature insulation barrier 52 cm thick would surround the entire reactor. The new fuel would be forced to the ignition point at the center of the reactor and be balanced by the plasma pressure as shown in FIG. 8.

I claim:

1. An improved plasma confining apparatus of the type having electromagnetic Ioffe bar windings, wherein the improvement comprises a plurality of interconnected Ioffe bar windings each winding being would in a spherical configuration about a plurality of different transverse axes of said spherical configuration, said axes being offset from the center of the spherical configuration, said spherical configuration comprising two adjacent concentric spherical surfaces, each said spherical surface having different finite radii, said Ioffe bar windings lying between said two adjacent concentric spherical surfaces, each said winding being composed of arcuate portions, said Ioffe bar windings forming a closed curve, at least one of said portions extending in said spherical configuration for a distance substantially one half the circumference of said spherical configuration.

2. An improved plasma containing and confining apparatus of the type defining an enclosed, evacuated reaction chamber and having surrounding electromagnetic confinement windings, wherein the improvement comprises said reaction chamber being generally spherical combined with a plurality of interconnected Ioffe bar windings each winding being would outside said reaction chamber in a spherical configuration about a plurality of different transverse axes of said reaction chamber, said axes being offset from the center of the spherical configuration, said spherical configuration comprising two adjacent concentric spherical surfaces, each said spherical surface having different finite radii, said Ioffe bar windings lying between said two adjacent concentric spherical surfaces, each said winding being composed of arcuate portions, said Ioffe bar windings forming a closed curve, at least one of said portions extending in said spherical configuration for a distance substantially one half the circumference of said spherical configuration.

3. An apparatus in accordance with claim 2 wherein there is further provided a source of alternating current connected to energize said windings, said source providing voltage alternations at the natural cyclotron resonance frequency of said chamber.

* * * * *

UNITED STATES PATENT AND TRADEMARK OFFICE
CERTIFICATE OF CORRECTION

PATENT NO. : 4,354,999
DATED : October 19, 1982
INVENTOR(S) : Robert V. Priest

It is certified that error appears in the above-identified patent and that said Letters Patent are hereby corrected as shown below:

In column 14, line 16, in claim 1, delete "would" and substitute therefor --- wound ---.

Signed and Sealed this

Twenty-first Day of December 1982

[SEAL]

Attest:

GERALD J. MOSSINGHOFF

Attesting Officer

Commissioner of Patents and Trademarks